United States Patent
Otoshi et al.

(10) Patent No.: US 6,368,532 B1
(45) Date of Patent: Apr. 9, 2002

(54) METHOD OF PRODUCING BIAXIALLY STRETCHED POLYESTER FILM

(75) Inventors: Masaaki Otoshi; Takanori Sato; Yasuyuki Hosono; Fumitaka Terai; Kazuo Ozaki, all of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/466,808

(22) Filed: Dec. 20, 1999

(30) Foreign Application Priority Data

Dec. 18, 1998 (JP) ............................. 10-359875

(51) Int. Cl.⁷ ..................... B29C 55/14; B29C 71/02
(52) U.S. Cl. ................. 264/210.5; 264/210.7; 264/235.8
(58) Field of Search .............. 264/210.5, 210.7, 264/235.8, 290.2

(56) References Cited

U.S. PATENT DOCUMENTS

| | | |
|---|---|---|
| 4,020,141 A | 4/1977 | Quinn et al. |
| 4,093,695 A | 6/1978 | Heirbaut |
| 5,914,220 A | * 6/1999 | Murayama ........... 264/290.2 X |

FOREIGN PATENT DOCUMENTS

| | | |
|---|---|---|
| DE | 2208173 | 9/1972 |
| DE | 2418929 | 11/1974 |
| DE | 2607657 A1 | 9/1976 |
| EP | 0 808 864 A1 | 11/1997 |
| JP | 03161319 A | * 7/1991 |

OTHER PUBLICATIONS

Patent Abstracts of Japan vol. 007, No. 102 (M–211), Apr. 30, 1983 & JP 58 024418 A (Teijin KK), Feb. 14, 1983 *abstract*.

* cited by examiner

Primary Examiner—Leo B. Tentoni
(74) Attorney, Agent, or Firm—Sughrue Mion, PLLC

(57) ABSTRACT

The present invention improves the bowing phenomenon of a biaxially stretched polyester film which comprises stretching the longitudinally stretched cast film laterally at a temperature higher than the glass transition temperature of the polyester film from by 5° C. to by 50° C., staying the laterally stretched film in an intermediate zone for a period from 3 to 30 seconds which has been controlled at a temperature from higher than the lateral stretching temperature by 20° C. or more to lower than a heat setting temperature by 20° C. or less, and then heat-setting at the heat setting temperature which is lower than the melting point of the polyester film from by 30° C. to by 5° C.

4 Claims, 1 Drawing Sheet

Preheating Zone | Stretching Zone | Intermediate Zone | Heat Setting Zone | Heat Relaxing Zone | Cooling Zone

METHOD OF PRODUCING BIAXIALLY STRETCHED POLYESTER FILM

BACKGROUND OF THE INVENTION

This invention relates to a method of producing a biaxially stretched polyester film wherein the bowing phenomenon is improved by controlling conditions of lateral stretching. The polyester film is useful for a support for a photographic film.

Supports for a photographic film are needed to have the bowing phenomenon as small as possible. It is considered that the bowing phenomen is due to the distribution of molecular orientation in the width direction occurring caused by the thermal shrinkage at the central portion which is not fixed by a clip during the process of stretching a longitudinally stretched film laterally by a tenter.

The bowing is defined and evaluated by drawing a straight line in the width direction of a longitudinally stretched film at the entrance of a tenter, and measuring the bowed degree, i.e. the distance between the top of the bowed line and the straight line connected both sides of the film (B in FIG. 3) per the width of the film (W in FIG. 3) at the exit of the tenter. The less the bowing is, the less the distribution of properties in the width direction is, and accordingly, is preferable for the support for a photographic film.

Some trials were made for decreasing the bowing, and for example, the method disclosed in Japanese Patent KOKAI 3-193328 was made for the purpose of improving the bowing which comprises providng an intermediate zone having a length of the film width or more between the stretching zone and the heat setting zone, and cooling the film to the glass transition temperature or less. However, according to this method, the improvement in the bowing was not exhibited in the case of polyethylene-2,6- naphthalate film.

Japanese Patent KOKAI 3-216326 and 4-142916-8 disclose some modifications of the above method, such as restretching in the cooling process, relaxing in the lateral direction in the cooling process or the like. However, these methods were also not effective for the improvement in the bowing as to polyethylene-2,6- naphthalate film.

Moreover, the above methods are difficient in the care for raising a film forming speed, such as cooling conditions, and are inferior in generality.

Japanese Patent KOKAI 3-193329 and 3-207632 disclose the modification of the above method which provides nip rolls in the intermediate zone. However, nip rolls tend to generate abrasion and lateral unevenness, and therefore, the method is not suitable for the production of a support for a photographic film.

SUMMARY OF THE INVENTION

An object of the invention is to provide a method of producing a biaxially stretched polyester film having a small bowing, an excellent resistance to cleavage, and adaptability to the variation of film forming speed, and suitable for a support for a photographic film.

The present invention provides a method of producing a biaxially stretched polyester film by stretching a cast film sequentially first in the longitudinal direction and then in the lateral direction which has achieved the above object, which comprises stretching the longitudinally stretched cast film laterally at a temperature higher than the glass transition temperature of the polyester film from by 5° C. to by 50° C., staying the laterally stretched film in an intermediate zone for a period from 3 to 30 seconds which has been controlled at a temperature from higher than the lateral stretching temperature by 20° C. or more to lower than a heat setting temperature by 20° C. or less, and then heat-setting at the heat setting temperature which is lower than the melting point of the polyester film from by 30° C. to by 5° C.

Figure 1:
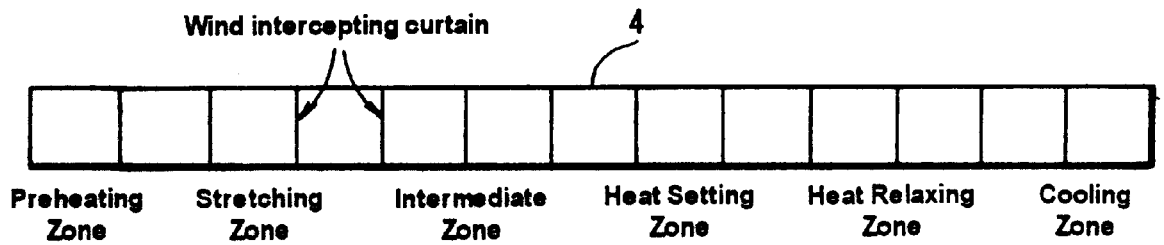
FIG. 1 illustrates the zone construction of the tenter portion of the apparatus for producing a biaxially stretched film used in the examples of the invention.

1 . . . T die
2 . . . Casting roll
3 . . . Longitudinal stretching machine
4 . . . Tenter
5 . . . Winder
6 . . . Film
61 . . . Cast film
62 . . . Longitudinally stretched film
63 . . . Biaxially stretched film
B . . . Bowed degree
W . . . Film width

DETAILED DESCRIPTION OF THE INVENTION

The polyester is a polymer produced by the polycondensation of a diol and a dicarboxylic acid. Representative dicarboxylic acids are terephthalic acid, isophthalic acid, phthalic acid, naphthalene dicarboxylic acid, adipic acid, sebacic acid, and the like, and representative diols are ethylene glycol, triethylene glycol, tetramethylene glycol, cyclohexane dimethanol, and the like. Illustrative of the polyesters are polyethylene terephthalate, polytetramethylene terephthalate, polyethylene-p-oxybenzoate, poly- 1,4-cyclohexylenedimethylene terephthalate, polyethylene-2,6-naphthalene dicarboxylate, and the like. The polyester includes homopolymer, copolymer and blend. Illustrative of comonomers are diethylene glycol, neopentyl glycol and polyalkylene glycol for the diol component, and adipic acid, sebacic acid, phthalic acid, isophthalic acid and 2,6-naphthalene dicarboxylic acid for the carboxylic acid component.

In the case that the polyester film is formed of the polyester and other polymer(s), a preferable content of the polyester if 50 wt. % or more, more preferably 80 wt. % or more.

The polyester may contain phosphoric acid, phosphorous acid, esters thereof and inorganic particles, such as silica, kaolin, calcium carbonate, titanium dioxide, barium sulfate, and alumina in the polymerization step, and inorganic particles as above and the like may be blended therewith after the polymerization. The polyester may contain other additives, such as stabilizer, coloring agent, flame retardant, and the like.

The processes for producing the polyester film of the invention comprises casting, stretching in the longitudinal direction (including preheating, stretching and cooling), and tenter portion (including preheating, stretching, heat setting, heat relaxing and cooling).

In the casting process, the polymer is dried sufficiently and extruded into sheet-shaped through an extruder, a filter and a die controlled in a temperature range higher than the melting point of the polymer from by 10° C. to by 50° C., and casted onto a cooling drum to solidify rapidly to obtain a cast film (unstretched film). The rapidly solidified film is substantially in an amorphous state. The cast film may a laminate formed by coextrusion.

The thickness of the cast film is, in general, about 100 to 3,000 $\mu$m, particularly about 400 to 2,000 $\mu$m.

Subsequently, the cast film is heated up to a temperature in the range from the glass transition temperature −50° C. to the glass transition temperature +10° C. at the preheating zone, while traveling at a speed of about 5 to 200 m/min, usually about 10 to 150 m/min. Representative preheating means are heating roll, hot air, infrared heater, and the like. The type of preheating may be single or a combination of two or more types. A preferable preheating temperature is from the glass transition temperature of the film −20° C. to the glass transition temperature of the film +10° C., more preferably the glass transition temperature of the film ±10° C.

The preheated cast film is delivered to the stretching zone, and stretched in the traveling direction of the film. The cast film is heated before stretching, and stretched in the traveling direction of the film by a stretching roll of which the circumferential speed has been raised. The longitudinal stretching may be single step or two steps or more. The stretching roll has, in general, a diameter of 100 to 300 mm, and is cooled by water passing therethrough or the like. The stretch ratio in the longitudinal direction is adjusted according to required properties of film, and is preferably 2 to 5 times, more preferably 2.5 to 4.5 times. The longitudinally stretched film is cooled, and delivered to the tenter process.

In the tenter process, the film is first heated. A suitable film temperature at the stretching in the lateral direction is from the glass transition temperature to the glass transition temperature +50° C., preferably to glass transition temperature +5° C. to the glass transition temperature +50° C. Representative heating means are hot air and infrared heater. The stretch ratio in the lateral direction is also adjusted according to required properties of film, and is preferably from 2 to 5 times, more preferably from 2.5 to 4.5 times.

In the invention, an intermediate zone is provided between the tenter zone and the heat setting zone. A preferable temperature of the film in the intermediate zone is from the lateral stretching temperature +20° C. to the heat setting temperature −20° C., more preferably temperature rise crystallization temperature ±20° C. The heating means is roller heating, infrared heater, hot air, microwave heating or the like. A suitable staying period of the film in the intermediate zone is from 3 to 30 seconds, preferably from 7 to 30 seconds.

The film passed through the intermediate zone is subjected to heat setting. A preferable heat setting temperature is from the melting point of the film −30° C. to the melting point of the film −5° C., more preferably from the melting point −30° C. to the melting point −15° C. A suitable heat setting period is adjusted according required properties of film, and preferably in the range of from 3 to 30 seconds. The heat-set film is subjected to heat relaxation at about 0 to 10%, usually about 0.5 to 6 % in the width direction, cooled and delivered from the tenter process.

The thickness of the biaxially stretched film thus produced is, in general, in the range from 30 to 300 m, usually 50 to 150 $\mu$m.

EXAMPLES

Figure 2:
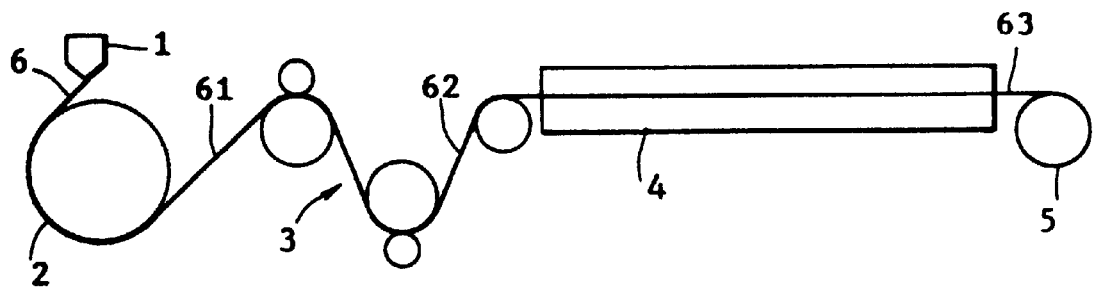
FIG. 2 is a schematic illustration indicating the total construction of the apparatus.
Figure 3:
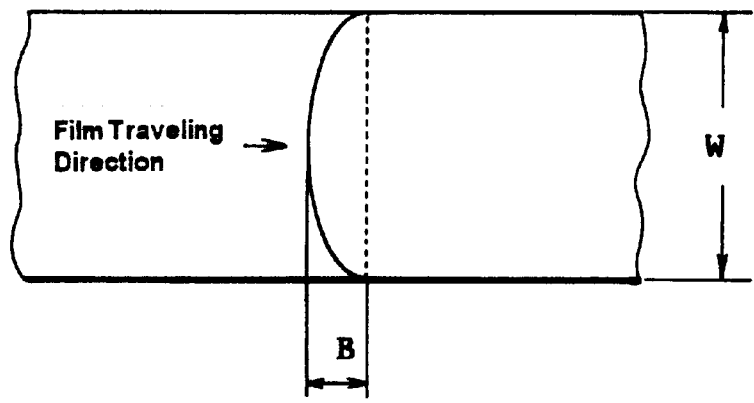
FIG. 3 is a plan view of a biaxially stretched film illustrating the state of bowing.

The construction of the apparatus for producing a biaxially stretched film used in the examples is shown in FIG. 2, the zone construction of the tenter portion thereof is shown in FIG. 1, and a state of bowing is illustrated in FIG. 3.

As shown in FIG. 2, the apparatus is composed of a T die 1 which extrudes molten resin, a casting roll 2 which receives the extruded resin film 6 and cools it to solidify, a longitudinal stretching machine 3 which stretches the solidified cast film 61 in the traveling direction, a tenter 4 which stretches the longitudinally stretched film 62 in the width direction, and a winder 5 which winds the biaxially stretched film 63.

The tenter 4 is, as shown in FIG. 1, divided from the entrance side into preheating zone, stretching zone, intermediate zone, heat setting zone, and cooling zone, and a curtain for intercepting air stream is provided between respective zones.

A state of bowing is shown in FIG. 3. A straight line (dotted line in FIG. 3) perpendicular to the longitudinal direction drawn at the entrance of a tenter becomes an arc line at the exit of the tenter as shown in FIG. 3 by a full line. The bowing degree is represented by the following formula:

$$\text{Bowing (\%)} = [B(\text{depth of the arc})/W(\text{film width})] \times 100$$

Example 1

Polyethylene-2,6-naphthalate resin was melted, and extruded from a T die having a discharge width of 500 mm onto a casting drum having a diameter of 1 m and a surface temperature of 50° C. being rotated at 5 m/min to produce a cast film. After stretching the cast film 3 times in the longitudinal direction, the longitudinally stretched film was stretched 3.5 times in the lateral direction by a tenter under the following conditions to produce a biaxially stretched film 90 $\mu$m in thickness.

| Lateral Stretching Temperature: | 160° C. |
|---|---|
| Temperature of Intermediate Zone: | 200° C. |
| Staying in Intermediate Zone: | 9 seconds |
| Heat Setting Temperature: | 250° C. |

Example 2

A biaxially stretched film 90 $\mu$m in thickness was produced similar to Example 1, except that the lateral stretching temperature was set at 125° C.

Example 3

A biaxially stretched film 90 $\mu$m in thickness was produced similar to Example 1, except that the lateral stretching temperature was set at 170° C.

Example 4

A biaxially stretched film 90 $\mu$m in thickness was produced similar to Example 1, except that the temperature of the intermediate zone was set at 180° C.

Example 5

A biaxially stretched film 90 $\mu$m in thickness was produced similar to Example 1, except that the temperature of the intermediate zone was set at 230° C.

Example 6

A biaxially stretched film 90 μm in thickness was produced similar to Example 1, except that the traveling speed in every process was elevated 3 times that of Example 1. As a result, the staying period in the intermediate zone became 3 seconds.

Example 7

A biaxially stretched film 90 μm in thickness was produced similar to Example 1, except that the length of the intermediate zone was lengthened 3.3 times. As a result, the staying period in the intermediate zone became 30 seconds.

Example 8

A biaxially stretched film 90 μm in thickness was produced similar to Example 1, except that the traveling speed in every process was made 4 times that of Example 7. As a result, the staying period in the intermediate zone became 7.5 seconds.

Example 9

A biaxially stretched film 90 μm in thickness was produced similar to Example 1, except that the heat setting temperature was set at 238° C.

Example 10

A biaxially stretched film 90 μm in thickness was produced similar to Example 1, except that the heat setting temperature was set at 263° C.

Comparative Example 1

When the lateral stretching temperature was set at 115° C. in Example 1, film rupture occurred frequently, and sampling of film could not be done.

Comparative Example 2

When the lateral stretching temperature was set at 180° C. in Example 1, uneven elongation occurred in the width direction, and sampling of film could not be done.

Comparative Example 3

A biaxially stretched film 90 μm in thickness was produced similar to Example 1, except that the temperature of the intermediate zone was set at 170° C.

Comparative Example 4

A biaxially stretched film 90 μm in thickness was produced similar to Example 1, except that the temperature of the intermediate zone was set at 240° C.

Comparative Example 5

A biaxially stretched film 90 μm in thickness was produced similar to Example 1, except that the traveling speed in every process was made 4 times that of Example 1. As a result, the staying period in the intermediate zone became 2.25 seconds.

Comparative Example 6

A biaxially stretched film 90 μm in thickness was produced similar to Example 1, except that the length of the intermediate zone was made ¼ time. As a result, the staying period in the intermediate zone became 2.25 seconds.

Comparative Example 7

A biaxially stretched film 90 μm in thickness was produced similar to Example 1, except that the heat setting temperature was set at 230° C.

Comparative Example 8

When the heat setting temperature was set higher than 265° C., the central portion of the film was slacked to generate abrasion by the contact with apparatuses in the tenter.

Process conditions and results of evaluations are summarized in Table 1.

Data of Comparative Examples 1, 2 and 8 could not been obtained, because sampling was impossible. The other films had no surface defect, such as abrasion.

A sample was taken from the cast film of polyethylene-2,6-naphthalate before biaxial stretching, and was measured by a differential scanning calorimeter ("DSC-50", Shimazu Seisakusho). As a result, it was found that the cast film had a glass transition temperature of 120° C., a temperature rise crystallization temperature of 200° C. and a melting point of 268° C.

The lateral stretching temperature was the film surface temperature measured at the final stretching zone by a noncontact type radiation thermometer. The heat setting temperature was the maximum temperature of each film surface in the tenter.

The staying period (second) in the intermediate zone was the length (m) of the intermediate zone/the traveling speed (m/min) of the film×60.

The bowing degree was measured at the center of the film having a width of 1,200 mm (see FIG. 3).

The uneven thickness of film was determined by dividing the difference between the maximum value and the minimum value in the width direction of each film by the mean thickness of the film, and expressed by percentage.

The resistance to cleavage was evaluated by tearing a sample of each film by an Elmendorf tearing tester (Toyo Seiki Seisaku-sho, Ltd.), and cleaving ability was evaluated in the longitudinal direction and in the lateral direction. The evaluation was as follows:

⊚ . . . No occurrence of cleavage

○ . . . Generation of cleavage was 20% or less

△ . . . Generation of cleavage was more than 20%

TABLE 1

| Stretching Conditions | Lateral Stretching Temp. (° C.) | Temp. of Intermediate Zone (° C.) | Staying in Intermediate Zone (sec.) | Heat Setting Temp. (° C.) | Bowing (%) | Uneven Thickness (%) | Resistance to Cleavage |
|---|---|---|---|---|---|---|---|
| Example 1 | 160 | 200 | 9.0 | 250 | 6.3 | 6.0 | ◎ |
| Example 2 | 125 | 200 | 9.0 | 250 | 7.0 | 7.0 | ◎ |
| Example 3 | 170 | 200 | 9.0 | 250 | 6.7 | 8.0 | ◎ |
| Example 4 | 160 | 180 | 9.0 | 250 | 6.7 | 6.0 | ◎ |
| Example 5 | 160 | 230 | 9.0 | 250 | 7.3 | 6.0 | ◎ |
| Example 6 | 160 | 200 | 3.0 | 250 | 7.3 | 5.5 | ◎ |
| Example 7 | 160 | 200 | 30.0 | 250 | 6.0 | 6.5 | ◎ |
| Example 8 | 160 | 200 | 7.5 | 250 | 6.3 | 6.0 | ◎ |
| Example 9 | 160 | 200 | 9.0 | 238 | 6.3 | 6.0 | ○ |
| Example 10 | 160 | 200 | 9.0 | 263 | 6.3 | 6.0 | ◎ |
| Comparative 1 | 115 | | | | | | |
| Comparative 2 | 180 | | | | | | |
| Comparative 3 | 160 | 170 | 9.0 | 250 | 9.3 | 6.0 | ◎ |
| Comparative 4 | 160 | 240 | 9.0 | 250 | 9.6 | 6.0 | ◎ |
| Comparative 5 | 160 | 200 | 2.25 | 250 | 10.5 | 7.0 | ◎ |
| Comparative 6 | 160 | 200 | 2.25 | 250 | 10.0 | 7.5 | ◎ |
| Comparative 7 | 160 | 200 | 9.0 | 230 | 6.0 | 5.5 | Δ |
| Comparative 8 | 160 | 200 | 9.0 | 265 | | | |

From the results in Table 1, the following matters can be seen.

Lateral Stretching Temperature

Referring to Examples 1–3 and Comparative Example 1, 2, a suitable range of the lateral stretching temperature is from the glass transition temperature to the glass transition temperature +50° C. In the range of less than the glass transition temperature, film rupture occurs during stretching. In the range of exceeding the glass transition temperature +50° C., uneven elongation occurs in the width direction of film. A preferable range of the lateral stretching temperature is from the glass transition temperature +25° C. to the glass transition temperature +45° C. In the range, uneven thickness in the width direction is very small.

Temperature of Intermediate Zone

Referring to Examples 1, 4, 5 and Comparative Example 3, 4, a suitable range of the temperature of the intermediate zone is from the lateral stretching temperature +20° C. to the heat setting temperature −20° C. In the range of less than the lateral stretching temperature +20° C., the relaxation of molecular strain energy accumulated in the film upon finishing the lateral stretching is small. As a result, contraction stress works strongly at the central portion not fixed by a clip in the heat setting zone, and the bowing phenomenon appears greatly. In the range of exceeding the heat setting temperature −20° C., thermal shrinkage occurs in the intermediate zone to shrink the central portion not fixed by a clip to induce the bowing phenomenon greatly. A preferable range of the temperature of the intermediate zone is the temperature rise crystallization temperature ±20° C. By keeping the intermediate zone temperature in the above range, the bowing phenomenon is further inhibited by the balance between the relaxation of molecular strain energy accumulated in the film upon finishing the lateral stretching and the thermal shrinkage of the central portion not fixed by a clip, and thereby, the bowing degree can be minimized.

Staying in Intermediate Zone

Referring to Examples 1, 6–8 and Comparative Examples 5, 6, a suitable range of the staying period of the film in the intermediate zone, i.e. passing time, is from 3 seconds to 30 seconds. In the range of less than 3 seconds, the relaxation of molecular strain energy accumulated in the film upon finishing the lateral stretching is small. As a result, contraction stress works strongly at the central portion not fixed by a clip in the heat setting zone, and the bowing phenomenon appears greatly. On the other hand, even exceeding 30 seconds, influences upon performances of the film are not great, but the longer zone requires to increase cost.

Heat Setting Temperature

Referring to Examples 1, 9, 10 and Comparative Examples 7, 8, a suitable range of the heat setting temperature is from the melting point −30° C. to the melting point −5° C. In the range of less than the melting point −30° C., the film tends to be cleaved, and breakage occurs in the subsequent processes for making a support for a photographic film. In the range of exceeding the melting point −5° C., partial slacking occurs during conveying the film to induce abrasion.

What is claimed is:

1. A method of producing a biaxially stretched polyester film by stretching a cast film sequentially first in the longitudinal direction and then in the lateral direction, which comprises stretching the longitudinally stretched cast film laterally at a temperature higher than the glass transition temperature of the polyester film from by 5° C. to by 50° C., staying the laterally stretched film in an intermediate zone for a period from 3 to 30 seconds which has been controlled at a temperature from higher than the lateral stretching temperature by 20° C. or more to lower than a heat setting temperature by 20° C. or less, and then heat-setting at the heat setting temperature which is lower than the melting point of the polyester film from by 30° C. to by 5° C. to form a biaxially stretched polyester film.

2. The method of claim 1 wherein said temperature in the intermediate zone is a temperature rise crystallization temperature ±20° C.

3. The method of claim 1 wherein the laterally stretched film stays in the intermediate zone for 7 to 30 seconds.

4. The method of claim 1 wherein the biaxially stretched polyester film is polyethylene-2,6-naphthalate film having a thickness of 30 to 300 μm.

* * * * *